Figure 1:
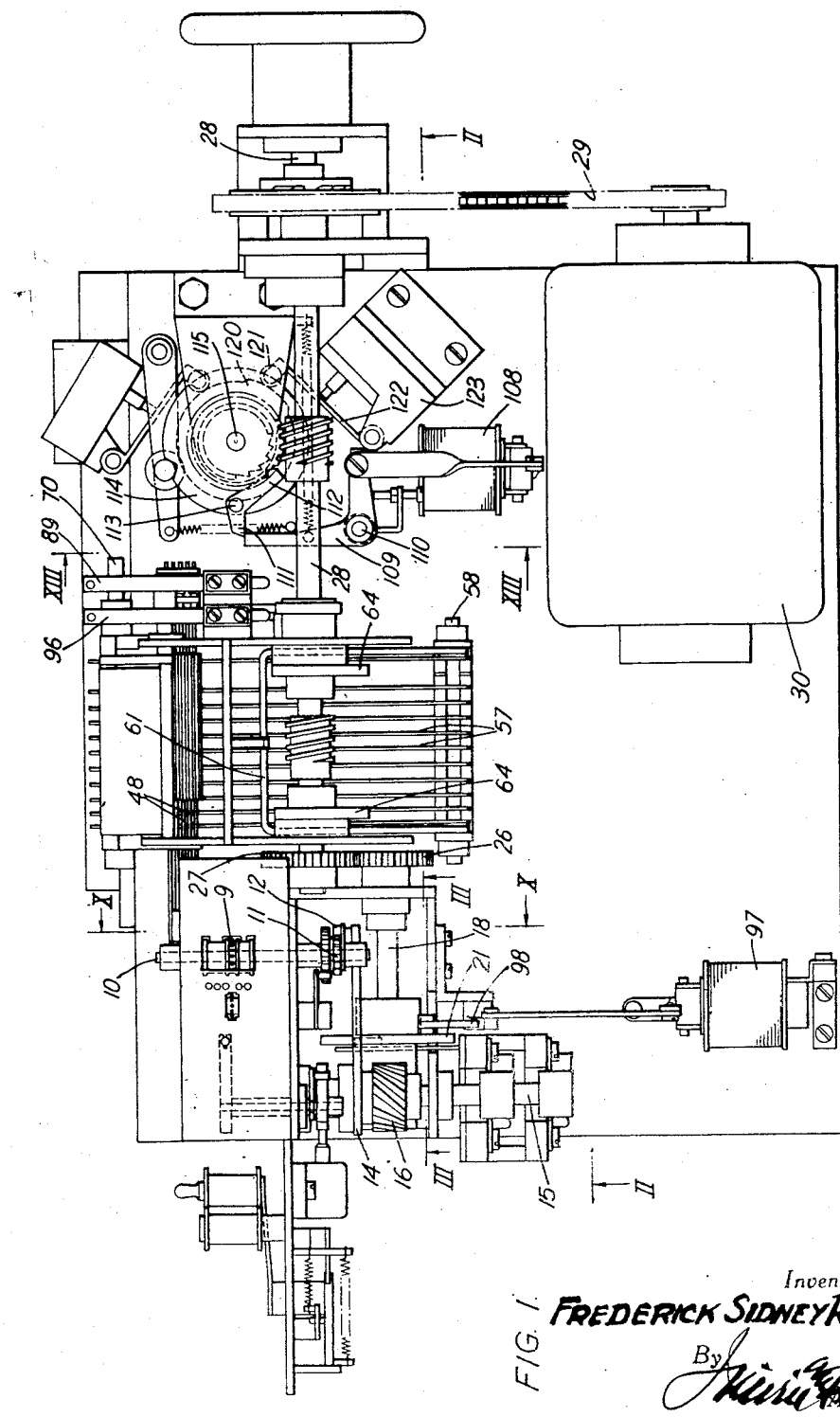

FIG. I.

Inventor
FREDERICK SIDNEY RHODES

Oct. 2, 1956  F. S. RHODES  2,765,038
MACHINES FOR PUNCHING RECORD CARDS
Filed Jan. 25, 1954  8 Sheets-Sheet 3

Inventor
FREDERICK SIDNEY RHODES
By

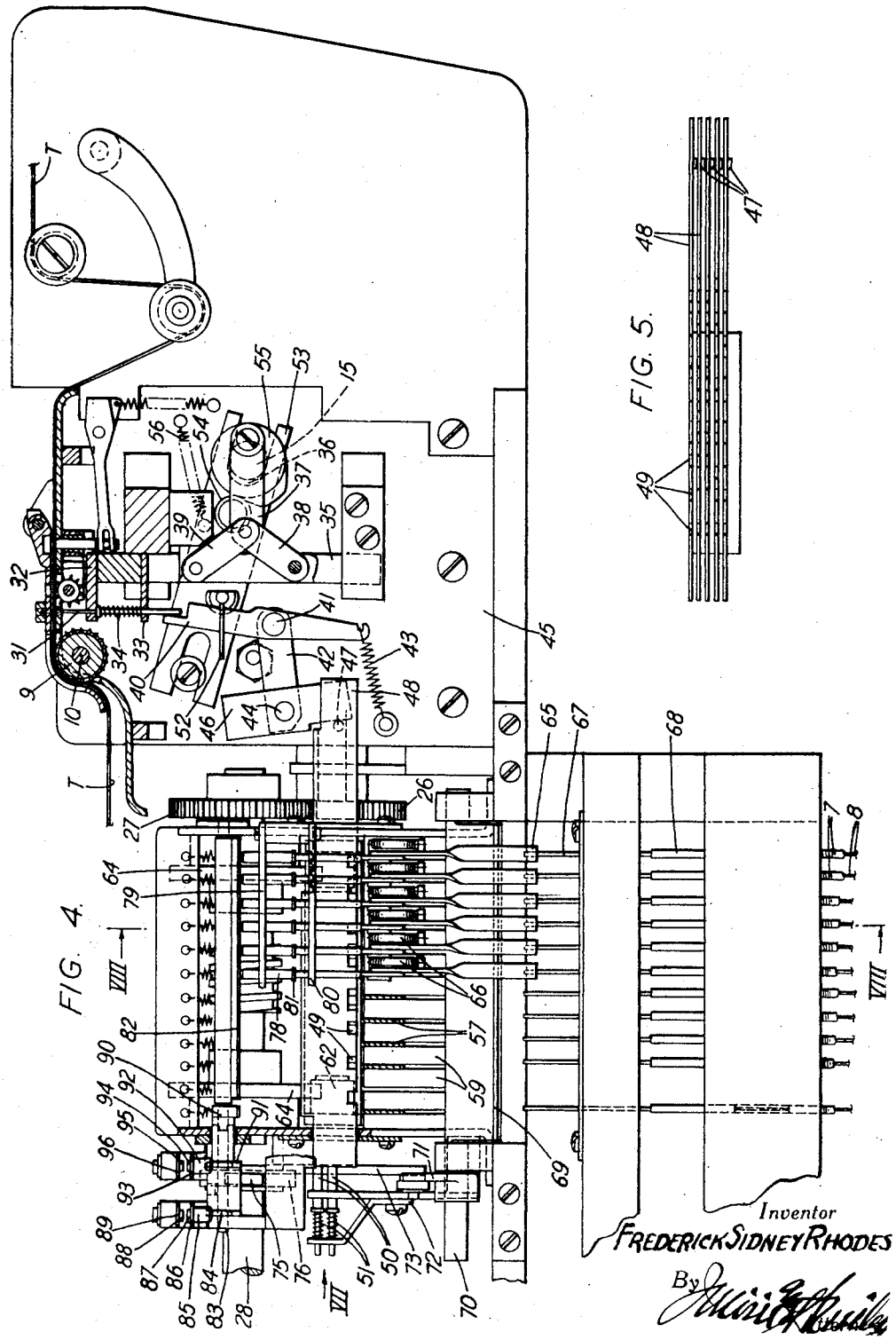

Inventor
FREDERICK SIDNEY RHODES
By

Oct. 2, 1956  F. S. RHODES  2,765,038
MACHINES FOR PUNCHING RECORD CARDS
Filed Jan. 25, 1954  8 Sheets-Sheet 6

Inventor
FREDERICK SIDNEY RHODES
By

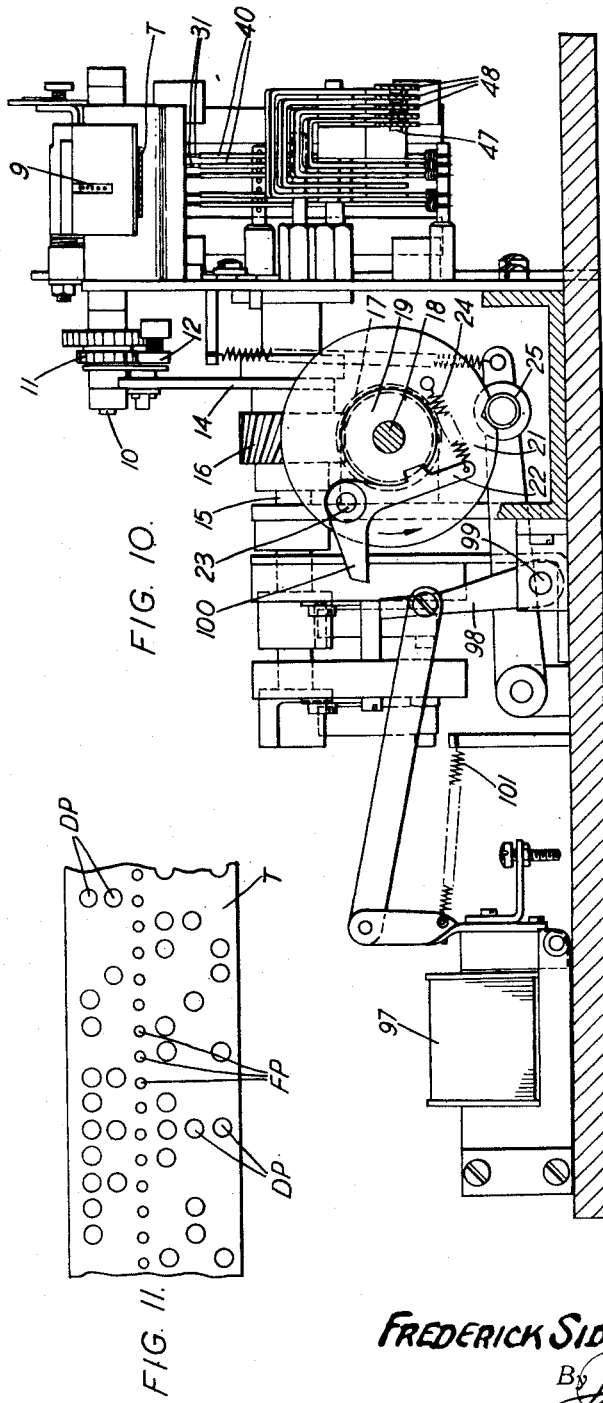

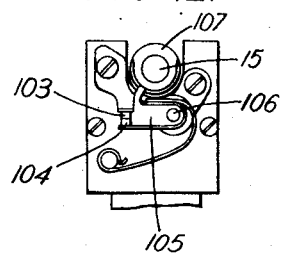
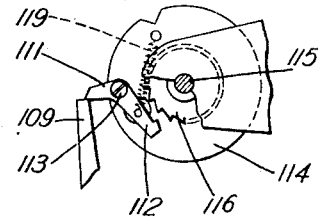
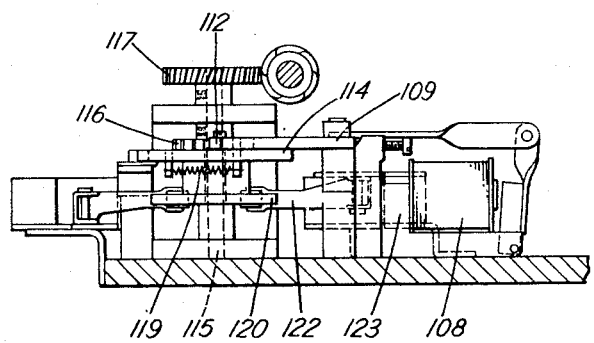
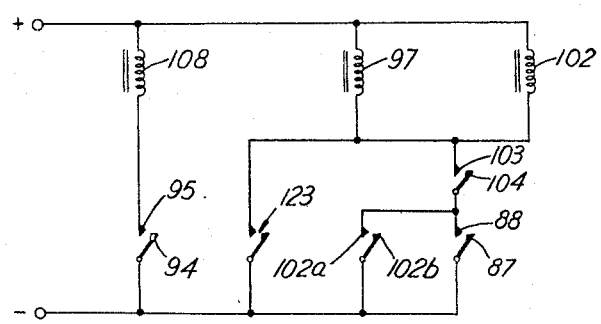

United States Patent Office 2,765,038
Patented Oct. 2, 1956

2,765,038

MACHINES FOR PUNCHING RECORD CARDS

Frederick Sidney Rhodes, Thornton Heath, England, assignor to Powers-Samas Accounting Machines Limited, London, England, a British company Application January 25, 1954, Serial No. 405,676

Claims priority, application Great Britain December 7, 1953

12 Claims. (Cl. 164—114)

This invention relates to machines for punching record cards under control of a perforated tape.

Machines for punching record cards under control of perforated tapes are well known in the art and for use with such machines it is customary to record data on a tape by perforations formed in the tape according to a predetermined code, for example according to a five-hole code. The data recorded in the tape is sensed therefrom and transmitted to a translator unit which translates the data sensed from the tape into a code suitable for punching in a statistical record card for use in controlling statistical machines, the data punched in the cards being usually punched in accordance with a one or a two-fold code. It may sometimes happen that in punching a tape the punching is effected in a manner such that the translator unit is unable to translate the data passed to it in a manner such that there is necessarily emitted therefrom signals which will result in operation of the punch-unit.

It is an object of the present invention to provide a machine for punching record cards under the control of a perforated tape, the machine being provided with means which is controlled by the translator unit in a manner such that feeding of the tape is arrested in the event that the translator unit has passed to it from the tape information which cannot be translated by the translator unit to permit the transmission therefrom of a signal to effect an operation of the punch-unit.

A further object of the invention is to provide in a machine of the kind above mentioned mechanism which is controlled by the translator unit automatically to interrupt operation of the tape-feeding mechanism for a predetermined interval when the tape-sensing means transmits to the translator unit information which causes the translator unit to emit to the punch-unit of the machine a signal indicative of a card-punching and feeding operation to be effected thereby.

According to the present invention there is provided a machine for punching record cards under control of a perforated tape, comprising the combination with a punch-unit of tape-sensing means, tape-feeding means operable to feed a tape stepwise to and past the sensing means, translator means conditioned by the tape-sensing means, punch-unit control means co-operating with the translator means to transmit operating signals to the punch-unit, and tape-feed control means coupling the translator means and tape-feeding means and operable to render the tape-feeding means ineffective on conditioning of the translator means by the tape-sensing means to a condition thereof which prevents effective co-operation of the translator means with said punch-unit control means.

Figure 2:
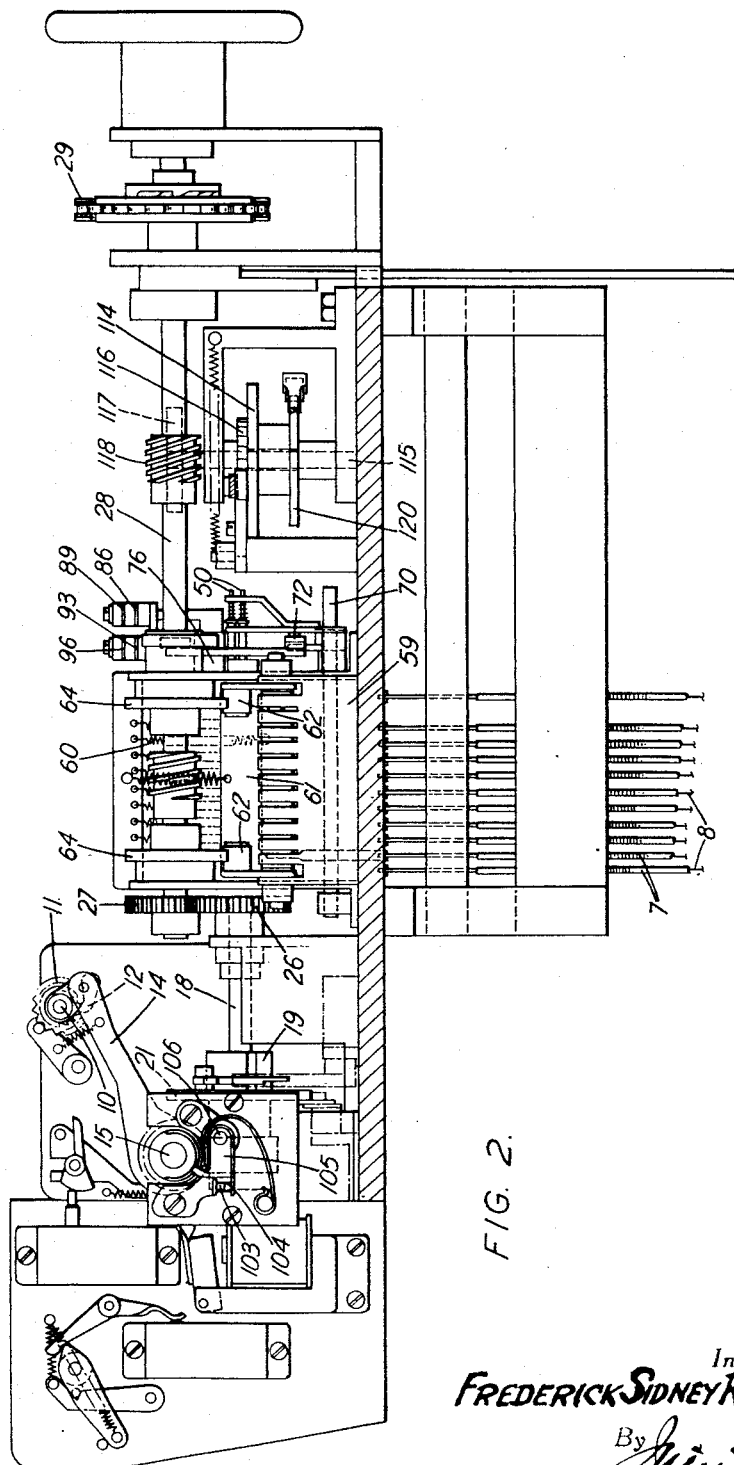
Figure 3:
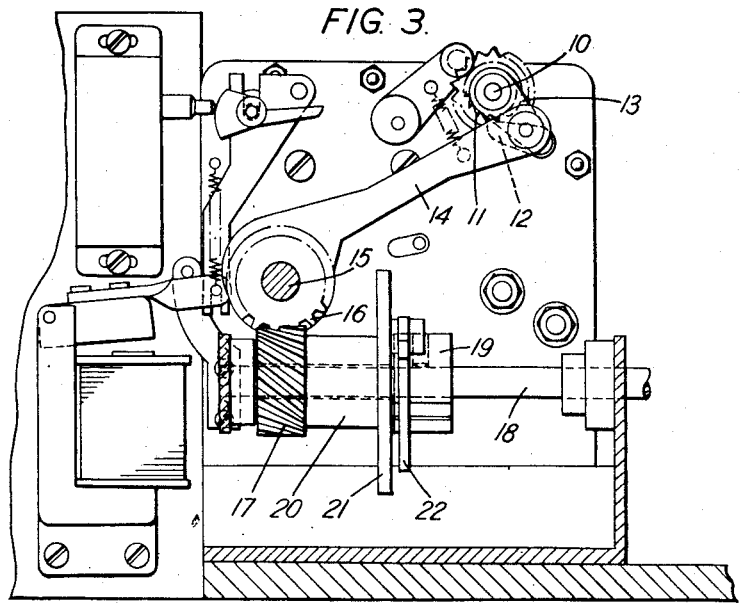
Figure 7:
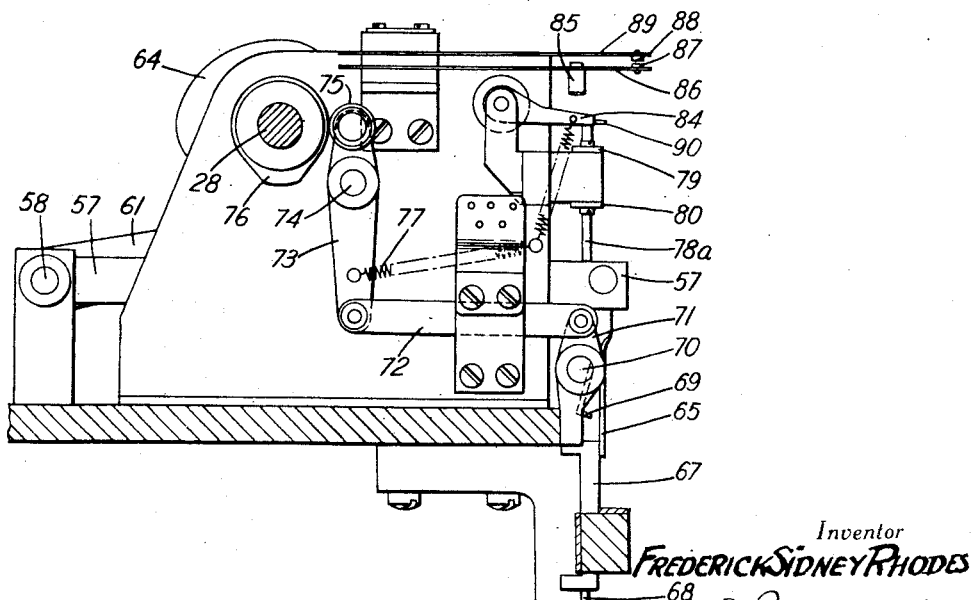
Figure 6:
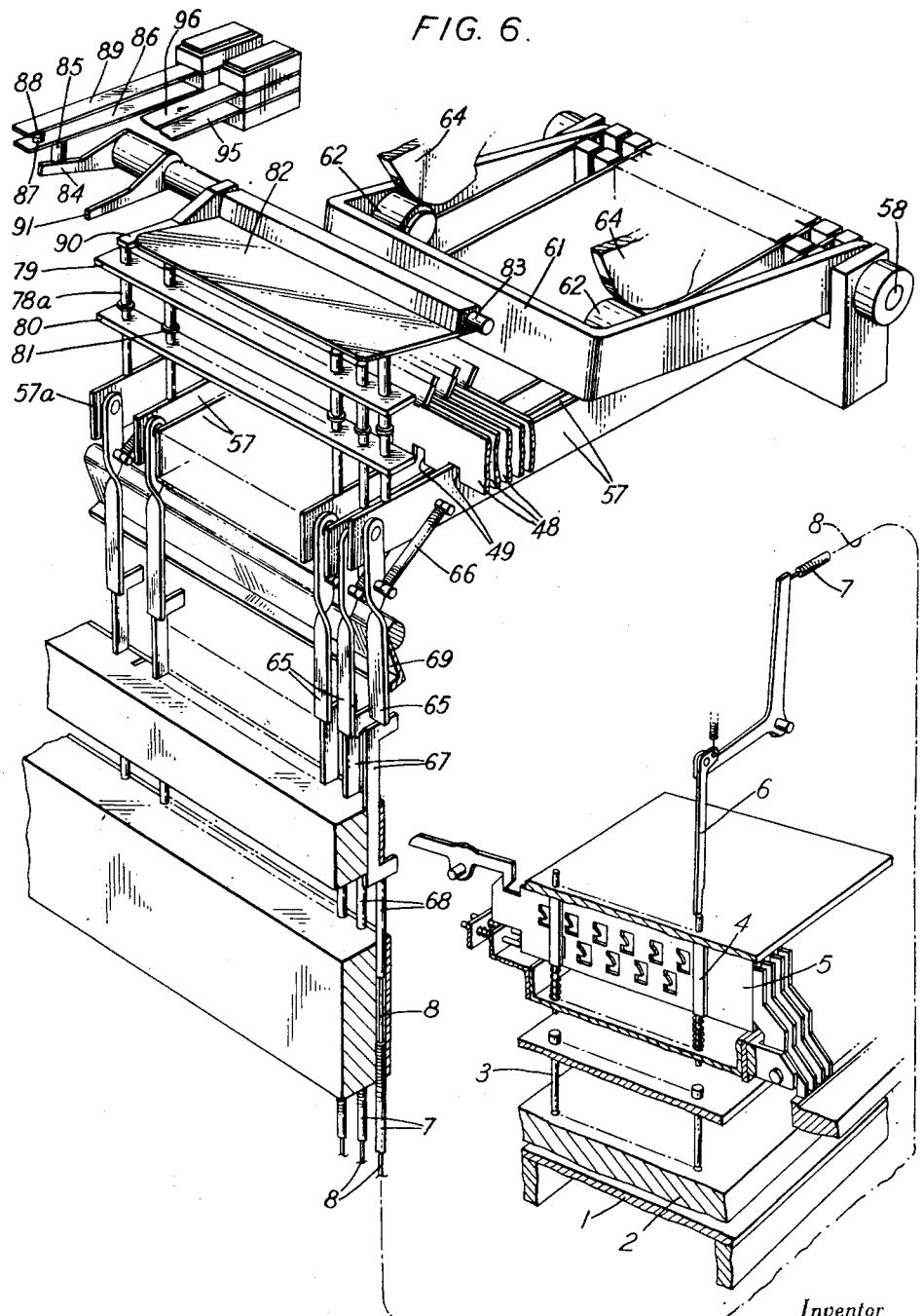
Figure 8:
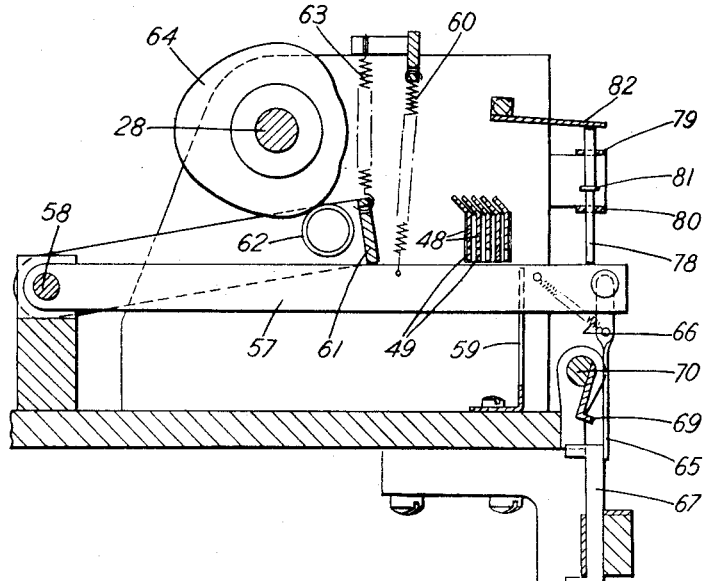
Figure 9:
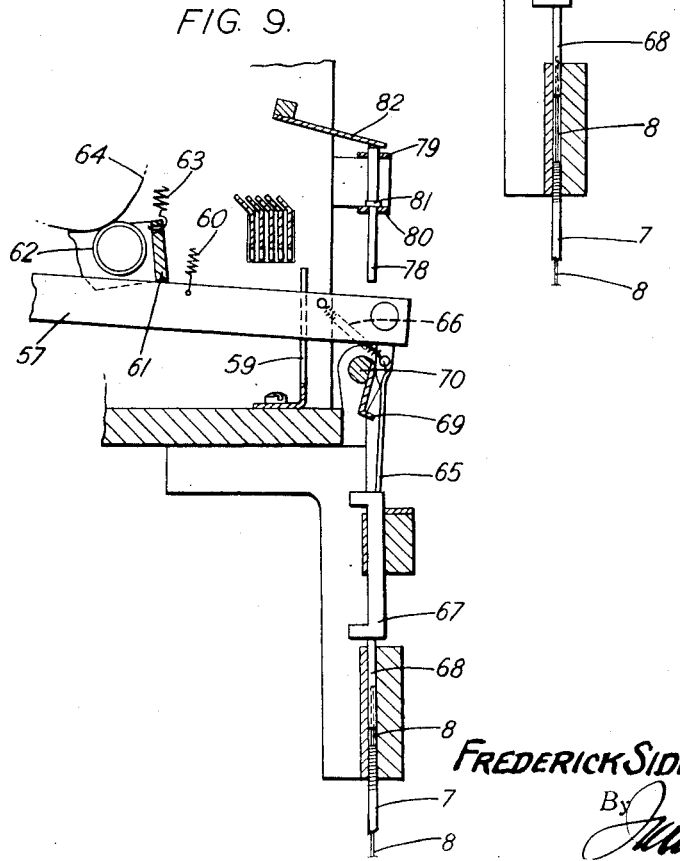

In order that the invention may be clearly understood, one embodiment thereof will now be described, by way of example, with reference to the accompanying diagrammatic drawings in which:

Fig. 1 is a plan of a tape-sensing and translator unit,
Fig. 2 is a section on line II—II, Fig. 1,
Fig. 3 is a section on line III—III, Fig. 1,
Fig. 4 is an elevation, partly in section, of the tape-sensing and translator unit,
Fig. 5 is an underneath plan of code bars embodied in the translator unit,
Fig. 6 is a pictorial view illustrating the translator unit and a part of the punch-unit co-operating therewith,
Fig. 7 is an elevation of the translator unit, looking in the direction of arrow VII, Fig. 4,
Fig. 8 is a section on line VIII—VIII, Fig. 4,
Fig. 9 is a view of part of Fig. 8, showing the parts in different positions thereof from the positions shown in Fig. 8,
Fig. 10 is a section on line X—X, Fig. 1,
Fig. 11 illustrates a portion of a tape for use in the machine being described,
Fig. 12 is a detail of the mechanism shown in Fig. 2,
Fig. 13 is a section on line XIII—XIII, Fig. 1,
Fig. 14 is a detail of a portion of the apparatus illustrated in Fig. 1, and
Fig. 15 is an electrical circuit illustrating the electrical connections between relays and switches embodied in the apparatus.

The tape-feeding and sensing mechanisms, the arrangement of code bars and testing elements therefor employed in the translator unit, and the punch-unit are all well known in the art and will be described herein only insofar as is necessary to the understanding of the present invention.

The punch-unit, illustrated diagrammatically in Fig. 6, consists of a well known form of punching machine in which cards are fed from a magazine, not shown, one at a time between die plates 1 and 2 with which co-operate columns of punches 3, one column being provided for each column of a card to be punched by the machine. The punches are conditioned for a punching operation by the set-bars 4 of a set-bar unit, being retained in the set positions thereof by shutters 5, and the columns of punches are conditioned one column at a time by set-bar-conditioning elements 6 supported by a carriage, not shown, the carriage being operated by escapement mechanism, also not shown, on conditioning of each column of punches by the set-bars therefor. The set-bar-conditioning elements 6 are operated by signals transmitted thereto from the translator unit, such signals being usually transmitted by flexible cables each consisting of an outer member 7, the ends of which are fixed, and an inner wire 8 which is movable lengthwise relative to the outer member 7 to transmit the signals. It will be understood that, if desired, instead of the signals being transmitted by flexible cables, the signals can be transmitted by electrical means. At the end of a punch-conditioning operation as determined by a tape T, such as that shown in Fig. 11, a signal is transmitted from the translator unit to the punch-unit to initiate a punching operation of the punch-unit so that, although the columns of punches are set up column by column, all punching is effected by one punching operation. Succeeding the punching operation of the punch-unit there is a card-feeding operation by which the next card is fed from the magazine into position in the die 1, 2.

The tape T is fed to the tape-sensing means, shown in plan in Fig. 1, by a rotatable pinwheel 9, Figs. 1 and 4, which engages with tape-feeding perforations FP, Fig. 11, and feeds the tape stepwise, one perforation at a time. It will be noted from Fig. 11 that each tape-feeding perforation FP is aligned with larger perforations DP, which are data-indicating perforations, the significance of which is to be translated by the translator unit into a form suitable for recording in a record card by the punches 3. The pinwheel 9 is angularly moved stepwise by a driving mechanism which consists of a shaft 10, Figs. 1, 2, 3, and 4, to which the pin-wheel is secured, together with a ratchet wheel 11, Figs. 1, 2, 3, and 10, operation of which is effected by a pawl 12 supported by a swinging arm 13, Fig. 3, to which is connected an eccentric strap 14 embracing an eccentric, not shown, secured to a tape-feeding and sensing shaft 15 which is connected, through gears 16, 17, with a sub-shaft 18 through a normally active one-revolution clutch including a clutch-dog 19 secured to the sub-shaft 18. The gear 17 is freely mounted on the sub-shaft 18 and is provided with a boss 20 to which is secured a clutch plate 21. A clutch pawl 22 is pivoted at 23, Fig. 10, to the clutch plate and is urged towards the clutch dog by a spring 24. When the clutch is in the open condition thereof the clutch plate 21 is held in the stationary position thereof by a detent roller 25 which co-operates with a notch in the periphery of the clutch plate 21, as shown in Fig. 10, the clutch in this figure having just been restored to the active condition thereof.

The sub-shaft 18 is driven through a pair of gears 26, 27, Figs. 1, 2, and 4, which have a 1:1 ratio, the gear 27 being secured to a main shaft 28 which is driven through a chain 29, Figs. 1 and 2, by an electric motor 30, Fig. 1.

Sensing of the tape is effected by a row of five sensing pins 31, Fig. 4, the pins being supported for axial movement between a pair of plates 32, 33, and urged towards the sensing positions thereof by springs 34. The plates 32 and 33 are carried by a support 35 mounted for vertical sliding movement under control of an eccentric 36 rotatable with the tape-feeding and sensing shaft 15 to effect operation of links 37, 38, and 39. When the pinwheel 9 has located the tape for sensing, support 35 is moved upwards by eccentric 36 and links 37, 38, 39 and those pins 31 which are aligned with perforations DP pass through the perforations, while the sensing pins 31 which do not pass through perforations are moved downwards against the action of their springs 34.

The sensing pins 31 are engaged by sensing fingers 40, Fig. 4, pivoted at 41 to setting brackets 42 and spring-urged towards the sensing pins 31 by springs 43. The brackets 42 are pivoted at 44 to a mounting plate 45, each setting bracket 42 supporting for movement therewith a setting piece 46 which engages with a lateral abutment 47, Figs. 4, 5, and 10, extending from a notched code bar 48. The notched code bars 48 comprise part of the translator unit and are of well-known construction each having notches 49. As can be seen from Fig. 5, there are five code bars 48, one for each of the sensing pins 31, and the notches 49 are so arranged that, by moving the code bars 48 lengthwise relative one to the other, a selected one notch in any of the five code bars can be brought into alignment with selected ones of the notches in each of the other bars. The arrangement of notches 49 in the five bars 48 covers all the combinations of data perforations DP which might be formed in the tape and, in Fig. 5 there is illustrated the position of the code bars when they have been moved in response to the sensing of a perforation DP in each of the five tape positions therefor. In the machine herein described, the combination of five perforations DP is that which is employed to cause the translator unit to transmit to the punch unit a signal which causes a punching operation to be effected and a new card to be fed to the punching position thereof. As can be seen from Fig. 11, in all instances other than that just mentioned data is recorded in the tape by a combination of two perforations DP in each column so that if in any particular tape column there should be less than two or more than two perforations DP such tape column is punched in error.

On raising of the support 35 to effect a sensing of the tape T, the sensing fingers 40 co-operating with the sensing pins 31 which pass through perforations DP are moved clockwise, as viewed in Fig. 4, about their pivots 41 by spring 43 when, owing to the passage of their sensing pins 31 through the tape perforations, the lower ends of the pins are raised above the upper ends of the sensing fingers. When moved by the spring 43 to the active positions, as just described, on downward movement of the support 35 the lower ends of the sensing pins 31 engage the upper ends of the sensing fingers 40 and cause the brackets 42 therefor to be rocked about their pivots 44 in a clockwise direction, as viewed in Fig. 4, so that the lower ends of the testing pieces 46 carried thereby, through abutments 47, move the code bars co-operating therewith to the left, as viewed in Fig. 4, against the action of return plungers 50 and co-acting springs 51. At the appropriate time, the active sensing fingers 40 are restored to the normal inactive positions thereof, as illustrated in Fig. 4, by a restoring plate 52 carried by a slide plate 53 on which is mounted a cam roller 54 co-operating with a cam 55 rotatable with the shaft 15. A spring 56 retains the roller 54 in co-operating engagement with cam 55.

After the code bars have been set in the manner just described, the relative positions thereof are tested by a plurality of code bar testing elements 57, Figs. 2, 4, 6, 7, 8, and 9, freely pivoted on a spindle 58, the testing elements 57 being guided for swinging movement about their pivot 58 by a comb element 59, Figs. 2, 4, 8, and 9. Each testing element 57 is urged upwards towards the code bars 48 by a spring 60 and is retained in the normal inactive position thereof, by a bail 61 which is common to each of the testing elements 57, the bail being also pivoted on spindle 58 and carrying cam rollers 62 which, by means of springs 63, Fig. 8, are retained in engagement with cams 64 rotatable with the main shaft 28. To the free end of each testing element 57 is pivoted a normally inactive actuating finger 65, the finger being urged by a spring 66 towards the active position thereof, Fig. 9. As can be seen from Figs. 6, 7 and 8, the actuating fingers 65 are retained in the normally inactive positions thereof by engagement with a plunger 67 forming a signal emitter which, in combination with an axially movable pin 68, causes a signal to be transmitted to the punch-unit by the inner wire 8 of the flexible cable co-operating therewith.

After setting of the code bars has been effected, in the manner described above, the cams 64 permit the bail 61 to be raised by its springs 63 thus permitting springs 60 to effect raising of the testing elements 57 towards the code bars 48. Any testing element 57, such as that shown at the right-hand end of Fig. 6, which during its upward movement passes into a space formed by five aligned notches 49, one in each code bar, is raised above the level of the remaining testing elements which are arrested by the lower edges of the code bars. The position to which the testing element is raised on passing into the five aligned notches is such that the lower end of the actuating finger 65 pivoted thereto is raised above the upper end of the plunger 67 so that the spring moves the actuating finger to the active position thereof in which position it is disposed above the plunger 67, as illustrated at the right-hand end of Fig. 6. When the cam 64 again moves the bail 61 downwards, the bail will engage each of the testing elements 57 and will restore them to the inactive position thereof, but that testing element whose actuating finger 65 is in the active position thereof will cause the plunger 67 to be moved downwards thereby to transmit a signal to the punch-unit, as illustrated in Fig. 9. Restoring of an active actuating finger 65 to the inactive position thereof is effected in timed relation with the movements of the bail 61 by a restoring element 69 consisting of an angle piece carried by a rock shaft 70. The rock shaft 70 has secured thereto an arm 71, Fig. 7, to which is connected a link 72, Figs. 2 and 7, the link 72 being also connected to a link lever 73 pivoted at 74 and carrying a cam roller 75 which co-operates with a cam 76 rotatable with the main shaft 28. A spring 77 maintains co-operation between roller 75 and cam 76. On operation of the restoring element 69 the active actuating finger 65 is moved thereby out of engagement with the upper end of its plunger 67 so that, under the influence of the bail 61, it is moved downwards to resume the inactive position thereof as illustrated in Figs. 7 and 8.

The apparatus so far described is all that which is well known in the art and there will now be described the apparatus which co-operates therewith and which is constructed in accordance with the present invention.

Referring particularly to Figs. 6 to 9, it will be seen that for each testing element 57 there is provided a contact-operating pin 78 which is supported by a pair of fixed plates 79, 80 so as to be axially movable in response to the movement of the testing element 57 with which it cooperates. Each pin 78 is provided with a collar or shoulder 81 which can co-operate with the plate 80 to determine the lowermost position of the pin which is otherwise free to move axially in response to the movements of its testing element. As can be seen in Fig. 6 there is provided a shutter 82 which is common to each of the contact-operating pins 78 with the exception of the pin 78a hereinafter referred to as a trip-contact-operating pin. The shutter 82 is secured to a contact-operating spindle 83 which is supported for rocking movement under control of any of the pins 78. Also secured to the spindle 83 is a contact-operating lever 84 which, on clockwise movement of spindle 83, as viewed in Fig. 6, is raised to engage a pin 85 depending from a leaf spring 86 carrying an electrical contact 87 for co-operation with a further contact 88 carried by a second leaf spring 89. The contacts 87, 88, Figs. 6 and 15, are normally open contacts and are closed by the clockwise movement of the shutter 82. From Fig. 6 it will be clearly understood that clockwise movement of the shutter 82 will be effected each time any of the pins 78 is moved axially by its co-operating testing element 57 when such element moves into five aligned notches, as illustrated at the extreme right of Fig. 6.

The trip-contact-operating pin 78a co-operates with a testing element 57a, hereinafter referred to as a tape-delay-testing element, this testing element being that which co-operates with the code bars to determine when a data perforation DP is formed in each of the five perforation positions on the tape, thus indicating that a punching and feeding operation of the punch-unit is to be initiated. Co-operation with the pin 78a is an actuating arm 90 freely mounted on spindle 83. Connected with the actuating arm 90, for rocking movement therewith, is a lever 91 which, on clockwise movement of the actuating arm 90, as view in Fig. 6, is moved into engagement with a pin 92, Fig. 4, which depends from a leaf spring 93 and which carries an electrical trip-contact 94 for co-operation with a further trip contact 95 carried by a leaf spring 96. The trip contacts 94, 95, Figs. 4 and 15, are also normally open, as illustrated in Figs. 4 and 15, but are closed on clockwise movement of the actuating arm 90 when the tape-delay-testing element 57a is moved into five aligned notches in the code bars 48 preparatory to the emission of a signal to the punch-unit which will cause that unit to effect a card punching and feeding operation.

When the machine is in operation, each time the tape-sensing pins 31 condition the code bars in a manner such that one of the testing elements 57 is moved to the position thereof at which it is located in five aligned notches 49, its pin 78 moves the shutter 82 clockwise so that the normally open contacts 87, 88 are closed. The contacts 87, 88 are in circuit with an actuator shown as an electromagnet 97, Figs. 1, 10 and 15, thus energizing the relay and causing a normally active trip pawl 98, Fig. 10, to be moved counter-clockwise, as viewed in Fig. 10, about its pivot 99 out of the path of the tail 100 of the clutch pawl 22. The tail 100 of the clutch pawl 22 will, accordingly, be moved past the position at which it can be tripped by the trip pawl 98, thus ensuring that the tape will be fed step-wise by a further step. If, however, as a result of the sensing of the tape no pin 78 is raised to operate the shutter 82, the contacts 87, 88 will remain open, the electromagnet 97 will not be energized and the trip pawl 98 will be retained in the normally active position thereof by a spring 101 (Fig. 10). Thus when the tail 100 of the clutch pawl 22 is moved into engagement with the trip pawl 98, the clutch pawl will be tripped out of engagement with the clutch dog 19 and the clutch plate 21 will be retained in the stationary position thereof by co-operation between the detent roller 25 with the notch formed in the periphery of the clutch plate. When this occurs angular movement of the gear 17 ceases, and operation of shaft 15 is arrested so that no further tape-feeding or sensing operations can be effected. Accordingly, operation of the machine is interrupted until the electromagnet 97 is again energized. In the event that the interruption has been caused by the sensing of an error in the tape energization of the electromagnet is effected by a manually operable switch, not shown, after the operator has corrected the fault and re-conditioned the machine for further operation. When, however, the interruption is caused by the sensing of a punching and card-feeding combination of perforations PF the electromagnet 97 is automatically energized as is described below.

It will be understood that as the contacts 87 and 88 are closed by the upward movement of a pin 78, the period during which the contacts remain closed is of short duration because the bail 61 almost immediately moves the testing elements 57 downwards so that the active pin 78 is restored to the normally inactive position thereof. It is therefore necessary to ensure that the electromagnet 97 remains energized for a predetermined period to permit the tail 100 of the clutch pawl 22 to be moved past the tripping position thereof. To this end there is provided a hold-on-relay 102, see Fig. 15, which is in circuit with the electromagnet 97 and is controlled by a rotary switch consisting of normally open contacts 103, 104, Fig. 12, of which contact 104 is carried by an arm 105 rockable about a pivot 106 by a cam 107, rotatable with the shaft 15. The rotary switch, through contacts 102a, 102b on the hold-on relay 102, retains the electromagnet 97 in the energized condition thereof until the tail 100 has been moved past the tripping position thereof when the cam 107 opens the contacts 103, 104 thus breaking the circuit to electromagnet 97 and permitting spring 101 to restore the trip pawl 98 to the normally active position thereof.

When, as mentioned above, interruption of the one-revolution clutch is effected by the sensing of a punching and card-feeding combination of perforations DP the interruption is to be of predetermined duration and the tape-feeding and sensing automatically resumed at the termination of such interval. Provision for this condition is made by the trip-contact-operating pin 78a and the normally open contacts 94, 95.

On sensing of a single row of five perforations PF only the pin 78a is operated and this pin co-operates with the actuating arm 90, thereby to set in operation a delay clutch, see Figs. 1, 2, and 13, through trip contacts 94, 95 which are electrically connected with a second actuator shown as an electromagnet 108, arranged on energization thereof to move a normally active trip lever 109 counter-clockwise, as viewed in Fig. 1, about its pivot 110, thus moving the trip lever out of engagement with the tail 111 of a clutch pawl 112 pivoted at 113 to a clutch disc 114 freely rotatable about a vertical spindle 115. Secured to the spindle 115 for rotation therewith is a clutch dog 116 and a worm gear 117, Fig. 13, meshing with a worm 118 rotatable with the main shaft 28. The worm gear 117 and worm 118 are of 1:5 ratio. When the trip lever 109 is disengaged from tail 111, the clutch pawl 112 is urged by spring 119, Fig. 14, into engagement with the clutch dog 116 so that the clutch disc 114 commences to rotate. Secured to the clutch disc 114 for rotation therewith is a cam 120 arranged to co-operate with a roller 121 supported by the operating arm 122 of a normally open micro-switch 123 in circuit with the first electromagnet 97. The trip lever 109 is restored to the normally active position thereof just after rotation of disc 114 commences so that when the disc has completed one revolution the pawl 112 is again tripped out of co-operation with dog 116.

When the second electromagnet 108 is energized thus initiating operation of the delay clutch, the contacts 87, 88; 102a, 102b; and micro-switch 123 are all open, thus interrupting the circuit for electromagnet 97 and effecting tripping of the one-revolution clutch. The one-revolution clutch will accordingly remain tripped until, after five revolutions of the main shaft 28, the cam 120 operates to close the micro-switch 123 thus sending to the electromagnet 97 an impulse which will effect energization thereof thereby to move the trip pawl 98 out of the path of the tail 100 of clutch pawl 22 so that spring 24 restores the pawl 22 to operative engagement with dog 19, to effect re-starting of the tape-feeding and sensing shaft 15.

It will be understood that, although in the foregoing description and in the drawings referred to therein there is described and illustrated a translator unit for use in translating a tape of the kind shown in Fig. 11, the code bars of the translator unit may, if desired, in known manner, be modified to permit the transmission of single or of two different simultaneous signals to the column of set-bar-conditioning elements 6. It will, however, be understood that in such circumstances there will be provided a plurality of shutters and normally open contacts, similar to the contacts 87, 88, arranged to control energization of electromagnet 97.

I claim:

1. A machine for punching record cards under control of a perforated tape, comprising the combination with a punch-unit of tape-sensing means, a rotatable pinwheel to feed a tape stepwise to and past the sensing means, driving mechanism to effect stepwise angular movement of the pinwheel, a sub-shaft to effect operation of the driving mechanism, a main-shaft coupled to the sub-shaft to effect operation thereof, translator means including a plurality of notched code bars supported for lengthwise movement relative one to another to permit alignment of notches in the bars in response to signals received thereby from the sensing means, pivoted code bar testing elements and a pivoted-tape delay testing element each of which is spring-urged from an inactive position thereof towards the code bars to test relative positions thereof subsequent to a tape-sensing operation, punch-unit control means including for each testing element a normally inoperative signal emitter, an actuating finger pivoted to each testing element and normally retained in an inactive position thereof, a spring to urge each finger to the active position thereof in relation to its signal emitter when its testing element is moved into aligned notches in said code bars, a cam-operated bail common to all said testing elements to restore the testing elements to the inactive positions and to effect operation of signal emitters whose actuating fingers are in the active positions thereof, a restoring element common to all said fingers and operable in timed relation with said bail to restore an active finger to the normally inactive position thereof, tape-feed control means including a normally active one-revolution clutch connecting said sub-shaft and driving mechanism, a trip pawl normally active to effect disengagement of the clutch, a first electromagnet co-operating with the trip pawl to move it to the inactive position thereof to permit continued engagement of the clutch, normally open contacts in circuit with said first electromagnet to render it normally inactive, and contact-operating means operable under control of the translator means to close said contacts only when the tape-sensing means conditions the translator means for effective co-operation with said punch-control means, and delay means including a normally inactive delay clutch co-operating with said main shaft, a normally active trip lever to trip and render said delay clutch active, a second electromagnet co-operating with the trip lever to move it to the inactive position thereof, normally open trip contacts in circuit with the second electromagnet, trip-contact-operating means operable under control of the tape-delay testing element to close the trip contacts when the code bars are conditioned by the sensing means to determine emission of a card-punching and feeding signal to the punch unit, a switch in circuit with said first electromagnet, and a cam operable by the delay clutch to close said switch after a predetermined number of revolutions of the main shaft thereby to render active said first electromagnet.

2. A machine according to claim 1, including a hold-on electromagnet in circuit with said first relay to retain the first electromagnet in the active condition thereof after said contacts have been restored to the normally open condition thereof, and a rotary switch in circuit with said hold-on relay and rotated in timed relation with said one-revolution clutch to determine the instant at which the first electromagnet is restored to the inactive condition thereof and consequent movement of the trip pawl to the active position thereof.

3. A machine according to claim 2, wherein the contact-operating means includes a contact-operating pin for each testing element, each said pin being supported for axial movement in response to movement of its testing element, a shutter common to a plurality of said pins for actuation by any one of the pins, an angularly movable contact-operating spindle to which is secured said shutter, and a contact-operating lever movable with said spindle to control opening and closing of said contacts.

4. A machine according to claim 2, wherein the trip-contact-operating means comprises a trip-contact-operating pin supported for axial movement in response to movement of the tape-delay testing element, and an actuating arm freely supported on said spindle for movement by the trip-contact-operating pin thereby to control opening and closing of the trip contacts.

5. A machine according to claim 4, including a hold-on electromagnet in circuit with said first relay to retain the first electromagnet in the active condition thereof after said contacts have been restored to the normally open condition thereof, and a rotary switch in circuit with said hold-on relay and rotated in timed relation with said one-revolution clutch to determine the instant at which the first electromagnet is restored to the inactive condition thereof and consequent movement of the trip pawl to the active position thereof.

6. A machine according to claim 1, wherein the contact-operating means includes a contact-operating pin for each testing element, each said pin being supported for axial movement in response to movement of its testing element, a shutter common to a plurality of said pins for actuation by any one of the pins, an angularly movable contact-operating spindle to which is secured said shutter, and a contact-operating lever movable with said spindle to control opening and closing of said contacts.

7. A machine for punching record cards under control of a perforated tape, comprising the combination with a punch-unit of tape-sensing means, a rotatable pinwheel to feed a tape stepwise to and past the sensing means, driving mechanism to effect stepwise angular movement of the pinwheel, a sub-shaft to effect operation of the driving mechanism, a main-shaft coupled to the sub-shaft to effect operation thereof, translator means including a plurality of notched code bars supported for lengthwise movement relative one to another to permit alignment of notches in the bars in response to signals received thereby from the sensing means, and pivoted code bar testing elements spring-urged from inactive positions thereof towards the code bars to test the relative positions thereof subsequent to a tape-sensing operation, punch-unit control means including for each testing element a normally inoperative signal emitter, an actuating finger pivoted to the testing element and normally retained in an inactive position thereof, a spring to urge the finger to the active position thereof in relation to its signal emitter when its testing element is moved into aligned notches in said code bars, a cam-operated bail common to all said testing elements to restore the testing elements to the inactive positions thereof and to effect operation of signal emitters whose actuating fingers are in the active positions thereof, a restoring element common to all said fingers and operable in timed relation with said bail to restore an active finger to the normally inactive position thereof and tape-feed control means including a normally active one-revolution clutch connecting said sub-shaft and driving mechanism, a trip pawl normally inactive to effect disengagement of the clutch, a first electromagnet co-operating with the trip pawl to move it to the inactive position thereof to permit continued engagement of the clutch, normally open contacts in circuit with said first electromagnet to render it normally inactive, a hold-on relay in circuit with said first electromagnet to retain the first electromagnet in the active condition thereof after said contacts have been restored to the normally open condition thereof, and a rotary switch in circuit with said hold-on relay and rotated in timed relation with said one-revolution clutch to determine the instant at which the first electromagnet is restored to the inactive condition thereof and consequent movement of the trip pawl to the active position thereof, and contact-operating means operable under control of the translator means to close said contacts only when the tape-sensing means conditions the translator means for effective co-operation with said punch-control means.

8. A machine according to claim 7, wherein the contact-operating means includes a contact-operating pin for each testing element, each said pin being supported for axial movement in response to movement of its testing element, a shutter common to a plurality of said pins for actuation by any one of the pins, an angularly movable contact-operating spindle to which is secured said shutter, and a contact-operating lever movable with said spindle to control opening and closing of said contacts.

9. A machine according to claim 7, wherein the contact-operating means includes a contact-operating pin for each testing element, each said pin being supported for axial movement in response to movement of its testing element, a shutter common to a plurality of said pins for actuation by any one of the pins, an angularly movable contact-operating spindle to which is secured said shutter, and a contact-operating lever movable with said spindle to control opening and closing of said contacts.

10. A machine for punching record cards under control of a perforated tape, comprising the combination with a punch unit of tape-sensing means, tape-feeding means operable to feed a tape stepwise to and past the sensing means, driving mechanism to effect stepwise movement of the tape-feeding means, a sub-shaft to effect operation of the driving mechanism, a main-shaft coupled to the sub-shaft to effect operation thereof, translator means conditioned by the tape-sensing means, punch unit control means co-operating with the translator means to transmit operating signals to the punch unit, tape-feed control means including a normally active one-revolution clutch connecting said sub-shaft and driving mechanism, a trip pawl normally inactive to effect disengagement of the clutch, a first electromagnet co-operating with the trip pawl to move it to the inactive position thereof to permit continued engagement of the clutch, normally open contacts in circuit with said first electromagnet to render it normally inactive, a hold-on relay in circuit with said first electromagnet to retain the first electromagnet in the active condition thereof after said contacts have been restored to the normally open condition thereof, and a rotary switch in circuit with said hold-on relay and rotated in timed relation with said one-revolution clutch to determine the instant at which the first electromagnet is restored to the inactive condition thereof and consequent movement of the trip pawl to the active position thereof, and contact-operating means operable under control of the translator means to close said contacts only when the tape-sensing means conditions the translator means for effective co-operation with said punch-control means.

11. A machine for punching record cards under control of a perforated tape, comprising the combination with a punch unit of tape-sensing means, tape-feeding means operable to feed a tape stepwise to and past the sensing means, driving mechanism to effect stepwise movement of the tape-feeding means, a sub-shaft to effect operation of the driving mechanism, a main-shaft coupled to the sub-shaft to effect operation thereof, translator means conditioned by the tape-sensing means and including a tape-delay testing element operative to test the condition of the translator means subsequent to a tape-sensing operation, punch unit control means co-operating with the translator means to transmit operating signals to the punch unit, tape-feed control means including a normally active one-revolution clutch connecting said sub-shaft and driving mechanism, a trip pawl normally inactive to effect disengagement of the clutch, a first electromagnet co-operating with the trip pawl to move it to the inactive position thereof to permit continued engagement of the clutch, normally open contacts in circuit with said first electromagnet to render it normally inactive, and delay means including a normally inactive delay clutch co-operating with said main shaft, a normally active trip lever to trip and render said delay clutch active, a second electromagnet co-operating with the trip lever to move it to the inactive position thereof, normally open trip contacts in circuit with the second electromagnet, trip-contact-operating means operable under control of the tape-delay testing means to close the trip contacts when the cone bars are conditioned by the sensing means to determine emission of a card-punching and feeding signal to the punch unit, a switch in circuit with said first electromagnet, and a cam operable by the delay clutch to close said switch after a predetermined number of revolutions of the main shaft thereby to render active said first electromagnet.

12. A machine according to claim 11, including a hold-on relay in circuit with said first electromagnet to retain the first electromagnet in the active condition thereof after said contacts have been restored to the normally open condition thereof, and a rotary switch in circuit with said hold-on relay and rotated in timed relation with said one-revolution clutch to determine the instant at which the first electromagnet is restored to the inactive condition thereof and consequent movement of the trip pawl to the active position thereof.

References Cited in the file of this patent
UNITED STATES PATENTS

| | | |
|---|---|---|
| 1,772,186 | Lee et al. | Aug. 5, 1930 |
| 1,976,600 | Carroll | Oct. 9, 1934 |
| 2,160,152 | Kelley | May 30, 1939 |
| 2,183,820 | Nelson et al. | Dec. 19, 1939 |
| 2,378,371 | Tholstrup | June 12, 1945 |
| 2,578,185 | Halvorsen | Dec. 11, 1951 |